United States Patent [19]

Phillips et al.

[11] 4,456,520

[45] Jun. 26, 1984

[54] POROUS RIGID TITANIUM DISULFIDE ELECTRODES FOR ELECTROCHEMICAL CELLS AND METHOD FOR PREPARING SAME

[75] Inventors: Gary M. Phillips, Vadnais Heights; Darrel F. Untereker, Cedar, both of Minn.

[73] Assignee: Medtronic, Inc., Minneapolis, Minn.

[21] Appl. No.: 353,047

[22] Filed: Mar. 1, 1982

[51] Int. Cl.³ .................. C25B 11/10; C01B 17/00; H01M 6/14

[52] U.S. Cl. .................. 204/291; 423/565; 429/194; 502/101

[58] Field of Search .................. 423/565; 429/194; 204/291, 290 F

[56] References Cited

U.S. PATENT DOCUMENTS

| | | | |
|---|---|---|---|
| 3,567,515 | 3/1971 | Maricle et al. | 429/218 X |
| 3,926,669 | 12/1975 | Auborn | 429/218 X |
| 3,951,685 | 4/1976 | Kronenberg | 429/218 X |
| 3,980,761 | 9/1976 | Thompson et al. | 423/565 |
| 3,996,069 | 12/1976 | Kronenberg | 429/197 |
| 4,002,492 | 1/1977 | Rao | 429/194 |
| 4,007,055 | 2/1977 | Whittingham | 423/565 |
| 4,048,407 | 9/1977 | Boter | 429/217 |
| 4,060,667 | 11/1977 | Askew et al. | 429/103 |
| 4,084,046 | 4/1978 | Whittingham | 429/194 |
| 4,091,176 | 5/1978 | Alfenaar | 429/40 |
| 4,104,451 | 8/1976 | Klemann et al. | 429/194 |
| 4,118,550 | 10/1978 | Koch | 429/194 |
| 4,143,217 | 3/1979 | Joo et al. | 429/218 |
| 4,144,383 | 3/1979 | Joo et al. | 429/218 |
| 4,201,839 | 5/1980 | Johnson et al. | 429/194 |
| 4,203,861 | 5/1980 | Thorp et al. | 252/182.1 |
| 4,228,227 | 10/1980 | Saathoff et al. | 429/194 |
| 4,233,375 | 11/1980 | Whittingham et al. | 429/194 |
| 4,252,876 | 2/1981 | Koch | 429/194 |
| 4,281,048 | 7/1981 | Haering et al. | 429/218 |

FOREIGN PATENT DOCUMENTS

2312124 12/1976 France .

38-18056 9/1963 Japan .

OTHER PUBLICATIONS

"Sulfur-Based Lithium-Organic Electrolyte Secondary Batteries," Research and Development Technical Report, ECOM-74-0072-F, Mar. 1976.

"Sulfur-Based Lithium-Organic Electrolyte Secondary Batteries," by Gerhard L. Holleck, et al, NTIS, U.S. Department of Commerce, Dec. 1974.

"Lithium Batteries," vol. 81-4, The Electrochemical Society, Inc., 1981.

"Titanium Disulphide as a Cathode Material in Lithium Batteries—A Review," Journal of Power Sources, 6 (1981) 307-317.

"LiB(CH₃)₄-Dioxolane Electrolyte in Rechargeable Li/TiS₂ Cells," Journal of the Electrochemical Society 128(1) 13-18, Jan. 1981.

"Power Sources for Biomedical Implantable Applications and Ambient Temperature Lithium Batteries," the Electrochemical Society, Inc., vol. 80-4, 1980.

Garriott et al, "Titanium Power Metallurgy A Commercial Reality," Modern Developments in Powder Metallurgy, pp. 1-11, Proceedings of the 1976 International Powder Metallurgy Conference.

Whittingham et al, Mat. Res. Bull., vol. 16, No. 1, pp. 37-45 (Jan. 1981).

*Primary Examiner*—F. Edmundson
*Attorney, Agent, or Firm*—Schroeder, Siegfried, Vidas & Arrett

[57] ABSTRACT

Rigid unitary porous titanium disulfide (TiS$_2$) electrodes, particularly useful in electrochemical cells. The electrodes are devoid of binders and other additives, except for incidental impurities. The electrodes are prepared by reacting elemental sulfur with a preformed porous titanium body of predetermined shape and size, the sulfur being provided in sufficient amount to stoichiometrically react completely with the titanium body thereby forming in situ a titanium disulfide body.

14 Claims, No Drawings

POROUS RIGID TITANIUM DISULFIDE ELECTRODES FOR ELECTROCHEMICAL CELLS AND METHOD FOR PREPARING SAME

BACKGROUND OF THE INVENTION

This invention is specifically concerned with improved titanium disulfide cathode electrodes, which are particularly useful in electrochemical cells. It is particularly intended to provide electrodes for electrochemical cells of the type including an oxidizable active anode metal and a non-aqueous alkali metal salt-organic solvent electrolyte solution. Preferably, the electrochemical cell will be a rechargeable battery. A preferred battery for using the improved cathode electrodes of the invention is one having a lithium anode and a liquid electrolyte of $LiAsF_6$ dissolved in a solvent such as 2-methyltetrahydrofuran.

Titanium disulfide has previously been prepared by at least three methods for electrochemical cell usage. In one method, titanium trisulfide is heated to a temperature at which it disproportionates to titanium disulfide and sulfur. Another procedure reacts titanium tetrachloride with hydrogen sulfide to form titanium disulfide. Unfortunately, such titanium disulfide usually contains substantial amounts of chlorine which is undesirable in many instances. Titanium disulfide has also been prepared by directly reacting titanium metal with elemental sulfur at temperatures in excess of 600° C. An improved procedure of this latter technique involves heating particulate metallic titanium to a reaction temperature between about 475° C. and 600° C. and contacting the heated titanium with an atmosphere having a sulfur partial pressure at the reaction temperature. The conditions are maintained for a period of time sufficient to ensure substantially complete reaction between the titanium and the sulfur.

These procedures provide particulate titanium disulfide which must then be formed into an electrode body if it is to be used as a cathode electrode. In the prior art, such bodies have been consistently formed by mixing the particulate titanium disulfide with inert binders such as Teflon, following which it is pressed and heated. Carbon is also ordinarily included in such electrodes bodies.

Due to the vagaries of the compositions of Teflon, carbon and the various solvents required to form a suitable binder, such electrodes can be of non-reproducible composition. Also, the preparation process involves a complicated multi-step procedure.

It is the primary object of this invention to provide porous, rigid titanium disulfide cathode electrodes which are devoid of binders and other additives, except for incidental impurities.

It is another object of this invention to provide a more simplified preparation procedure for making such electrodes.

The improved electrodes of the invention are of uniform composition and exhibit enhanced cycling characteristics in re-chargeable batteries. This allows the batteries to be charged and discharged at higher rates than has been possible with cells incorporating prior art titanium disulfide cathode electrodes.

SUMMARY OF THE INVENTION

A rigid, porous titanium disulfide unitary cathode electrode body is provided in accordance with this invention by reacting a porous titanium body with sulfur in a protective atmosphere eg., an inert one or an evacuated one. The porous titanium body is preformed from particulate metallic titanium by pressing and sintering the titanium particulate. The sulfur is provided in adequate amounts to result in stoichiometric combination with the titanium body whereby the body is converted into a porous, rigid, unitary titanium disulfide body, devoid of binders and other additives, except for incidental impurities.

The reaction between the titanium body and the sulfur may be accomplished by means of one or two heating steps. In a one-step method, the body is contacted with sulfur and heated to a temperature in excess of about 600° C., about 750° C. being preferred, for a time adequate to form titanium disulfide. This may be accomplished by immersing the body in molten sulfur and heating it or by exposing the body to vaporous sulfur in an evacuated container and heating it.

Preferably, a two-step method is used in which the titanium body is contacted with the sulfur at a first temperature below 600° C., preferably between about 450° C. and 600° C., the temperature being held for a time and then heating the contacted body at a temperature in excess of 600° C. for a time, 750° C. being preferred, adequate to form a uniform body of titanium disulfide.

Most preferably, the two-step method is accomplished with vaporous sulfur as is described in more detail hereinbelow.

DESCRIPTION OF SPECIFIC EMBODIMENTS

In carrying out the present invention, particulate titanium metal may be pressed into a desired form or shape and sintered to form a porous titanium body of predetermined size and shape. Porosity may be controlled by initial particle size and by pressing pressures. Reference may be made to an article entitled "Modern Developments In Powder Metallurgy" by R. E. Garriott and E. L. Thellmann which appeared in the Proceedings of the 1976 Powder Metallurgy Conference, sponsored by the Metal Powder Industries Federation and the American Powder Metallurgy Institute, P.O. Box 2054, Princeton, N.J. 08540, the content of which is incorporated herein by reference. Alternatively, porous titanium sheet of any desired thickness may be purchased from Gould, Inc., Gould Laboratories, Cleveland, Ohio, from whom it is commercially available as P/M Titanium. The sheet may be readily cut to any desired size and shape for the preform.

In providing the porous titanium metal preform body of predetermined shape and size, dimensional allowances must be made for the volume change which occurs in the titanium body upon its conversion to titanium disulfide i.e., swelling. For example, a porous titanium body having the dimensions 1.524 inches by 0.660 inches by 0.062 inches when reacted in a two chamber furnace with sulfur to form titanium disulfide, increased in size to 2.025 inches by 0.845 inches by 0.085 inches.

In the most preferred method of the invention, the titanium body and substantially stoichiometric amounts of elemental sulfur are placed in a quartz reaction vessel or the like. Preferably, the quartz reaction vessel will consist of two inter-connected chambers which contain respectively the titanium and the sulfur. However, a single chamber vessel may be used. A suitable quartz reaction vessel may, for example, comprise a tube of one or two inches in diameter. Of course, the size will vary depending on the size of the electrode body being prepared. Preferably, the reaction vessel is fitted with quartz supports for supporting the titanium body. Such supports will be spaced so as to prevent sagging or other deformation of the body during heating.

Generally, the reaction vessel, after loading and evacuation, is heated to a temperature sufficient to cause vapor transport of the sulfur and reaction between the sulfur and the titanium body. Differential heating temperatures are preferred. The reaction vessel may be differentially heated with electric heaters to establish a hot zone that contains the titanium body and a relatively cooler zone that contains the sulfur. For example, the titanium containing zone is preferably heated to a temperature of about 550° C.±50° whereas the sulfur containing zone is preferably heated to a temperature of about 450° C.±50°. The temperatures are maintained for about 24 hours preferably, the actual time being determined by the complete consumption of the sulfur. After conversion, the temperature in both zones is increased to about 750° C.±50° and maintained for about 24 hours. The actual time will depend on the temperature.

The following conditions relate to titanium disulfide cathodes which have been prepared by the most preferred method of the invention. The method comprises a two-step procedure carried out in an evacuated sealed reaction vessel having two chambers.

I.

temperature—titanium zone—550° C.
temperature—sulfur zone—450° C.
time—24 hours

II.

temperature—titanium reaction zone—750° C.
temperature—sulfur zone—750° C.
time—24 hours
titanium body size—1 inch×1 inch×0.62 inches The initial titanium and sulfur zone temperatures may be varied somewhat. For example, higher temperatures to about 750° C. may be used. A primary consideration in the initial heating step (I) is the strength of the container. The pressure of the sulfur must be controlled by controlling temperature so as to not rupture the container. Of course, the time for heating will vary depending on temperature.

The final heating temperature (II) may be as low as about 600° C.

Temperatures lower than about 600° C. are undesirable due to the possibility of the formation of multiple phases. Multiple phase formation is discussed in more detail in an article entitled "Formation of Stoichiometric Titanium Disulfide" by M. Stanley Whittingham and John A. Panella which appeared in the Mtl. Res. Bull., Vol. 16, pp. 37-45 (1981).

The resultant titanium disulfide bodies formed by the method of the invention are porous, rigid unitary bodies devoid of binders or any other additives, except for incidental impurities and are ready for use as electrodes.

While the present invention has been described with reference to specific preferred embodiments thereof, it will be understood by those skilled in this art that various changes may be made without departing from the true spirit and scope of the invention. In addition, many modifications may be made to adapt the invention to a given situation without departing from its essential teachings.

Having described the invention, the exclusive property rights to which applicants are entitled are defined in the following claims.

What is claimed is:

1. A cathode for electrochemical cells comprising a rigid, porous body of predetermined shape, the body consisting only of titanium disulfide and being devoid of binders and other additives, except for incidental impurities, wherein the cathode is made by the method comprising the steps:

providing a unitary porous preformed body of pressed and sintered titanium metal;

contacting substantially the entire surface of the body with sulfur in an amount adequate to stoichiometrically provide titanium disulfide;

heating the titanium body and the sulfur to a temperature of about 600° C. or higher in a protective atmosphere to cause a reaction therebetween, and maintaining the heating for a time adequate to completely convert the titanium preformed body to titanium disulfide.

2. The method of making a porous, rigid titanium disulfide electrode body devoid of binders, comprising the steps:

providing a unitary porous preform body of pressed and sintered titanium metal;

enclosing the titanium body within an evacuated reaction container along with a sufficient quantity of elemental sulfur to stoichiometrically combine with the titanium body to convert it to titanium disulfide;

heating the titanium body to a temperature of about 600° C. or higher;

heating the sulfur to a temperature at which vapor transport of the sulfur occurs, and maintaining the heating temperature of the titanium for a period of time sufficient to completely convert the titanium body to titanium disulfide.

3. The method of claim 2 wherein the heating period is about 24 hours.

4. The method of claim 2 wherein the heating temperature of the sulfur is about 450° C.

5. The method according to claim 2 wherein the titanium body is heated to a temperature less than about 600° C. but at a level at which reaction with vaporous sulfur occurs, and the reacted body is subsequently subjected to a further heat treatment in excess of about 600° C.

6. The method of claim 5 wherein the subsequent heating temperature is about 750° C.

7. The method of claim 6 wherein the subsequent heat treatment is maintained for about 24 hours.

8. The method of making a porous rigid titanium disulfide electrode body devoid of binders and the like, comprising the steps:

providing a unitary porous preform body of pressed and sintered titanium metal;

contacting substantially the entire surface of the body with sulfur in an amount adequate to stoichiometrically provide titanium disulfide;

heating the titanium body and the sulfur to a temperature of about 600° C. or higher in a protective atmosphere to cause a reaction therebetween, and maintaining the heating for a time adequate to completely convert the titanium body to titanium disulfide.

9. The method of claim 8 wherein the sulfur is provided in liquid form and the titanium body is immersed in the sulfur.

10. The method of claim 8 wherein the sulfur is provided in vaporous form in a sealed container including the titanium body.

11. The method of claim 8 wherein the titanium body and the sulfur are initially heated during the contacting step to a temperature between about 450° C. and about 600° C. for about 24 hours following which they are heated to a temperature in excess of about 750° C. for about 24 hours.

12. The cathode of claim 1 wherein the contacting of the surface of the titanium body with sulfur is accomplished by enclosing the titanium body within an evacuated reaction container along with a sufficient quantity of elemental sulfur to stoichiometrially combine with the titanium body and convert it to titanium disulfide;

the titanium body is heated to a temperature of about 600° C. or higher;

the sulfur is heated to a temperature at which vapor transport of the sulfur occurs, and the heating temperature of the titanium body is maintained for a period of time sufficient to completely convert the titanium body to titanium disulfide.

13. The cathode of claim 1 wherein the contacting of the surface of the titanium body with sulfur is accomplished by immersing the body in molten sulfur.

14. The cathode of claim 1 wherein the sulfur is provided in vaporous form in a sealed container including the titanium body whereby the surface of the titanium body is contacted by the sulfur in vaporous form.

* * * * *